United States Patent [19]

Lyle

[11] Patent Number: 4,499,335
[45] Date of Patent: Feb. 12, 1985

[54] ANNOUNCEMENT RECORDING AND MESSAGE PLAYBACK SYSTEM FOR A TELEPHONE ANSWERING MACHINE

[75] Inventor: Stephen V. Lyle, San Pedro, Calif.

[73] Assignee: T.A.D. Avanti, Inc., Compton, Calif.

[21] Appl. No.: 457,898

[22] Filed: Jan. 14, 1983

[51] Int. Cl.³ .................. H04M 1/21; H04M 1/64
[52] U.S. Cl. .................. 179/6.03; 179/37; 381/85; 381/111; 381/115
[58] Field of Search .............. 179/37, 6.01, 6.03; 381/115, 117, 122, 85, 111

[56] References Cited

U.S. PATENT DOCUMENTS 3,849,603 11/1974 Proios .................. 179/37

FOREIGN PATENT DOCUMENTS 56-2776 1/1981 Japan .................. 179/6.01

OTHER PUBLICATIONS

Popular Electronics, vol. 20, #4, p. 10 (APF Model 226 Telephone) 4/82.

Primary Examiner—Robert L. Richardson
Attorney, Agent, or Firm—Keith D. Beecher

[57] ABSTRACT

A system for a telephone answering machine for recording new announcements on the announcement tape, for dictating notes or other material on the message tape, and for reproducing messages recorded on the message tape, all by means of a single transducer, so that the need for a separate microphone for dictation purposes and for recording new announcements on the announcement tape is obviated.

7 Claims, 2 Drawing Figures

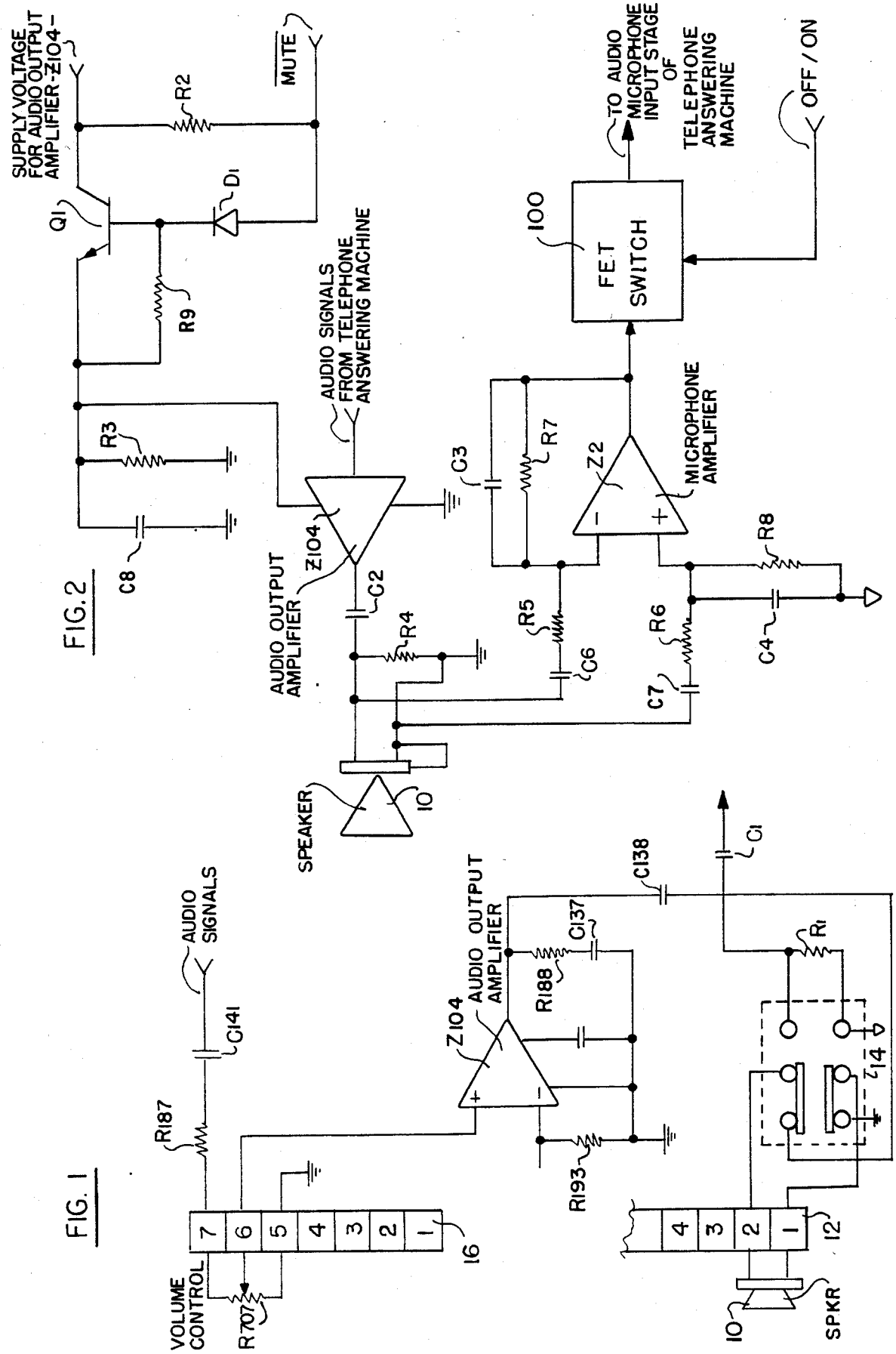

ANNOUNCEMENT RECORDING AND MESSAGE PLAYBACK SYSTEM FOR A TELEPHONE ANSWERING MACHINE

BACKGROUND OF THE INVENTION

The usual present-day telephone answering machine includes an announcement magnetic tape mechanism which is activated in response to a ring signal received over the telephone line, and which causes a recorded announcement to be transmitted over the telephone line to the calling party. At the end of the announcement, a message magnetic tape mechanism is activated to enable the calling party to record his message.

The prior art machines incorporate playback circuitry including a speaker which permits the user of the machine to play back the messages recorded on the message tape. Such prior art machines also include appropriate recording circuitry into which a microphone may be plugged to enable the user to record a new announcement on the announcement tape when he so desires, and to dictate notes and other material on the message tape.

The system of the present invention combines the playback and recording circuitry referred to in the preceding paragraph to provide a simple, inexpensive and efficient circuit in which a single transducer, such as the conventional speaker, is used both to play back recorded messages from the message tape and to function as a microphone to enable new announcements to be recorded on the announcement tape, and material to be dictated on the message tape.

BRIEF DESCRIPTION OF THE DRAWING

FIG. 1 is a schematic diagram of a circuit to be connected into the circuit of a telephone answering machine to incorporate the teachings of the present invention, in one of its embodiments; and FIG. 2 is a schematic diagram of a second embodiment in which the circuit utilizes electronic switching which may be microprocessor controlled.

DETAILED DESCRIPTION OF THE ILLUSTRATED EMBODIMENT

In the system of FIG. 1, a speaker 10 is connected through a usual terminal board 12 to the common terminals of a switch 14. Switch 14 has a first position in which outgoing audio signals from the telephone answering machine are introduced to speaker 10 to permit the speaker to convert such signals into sound. Switch 14 also has a second position in which the speaker 10 functions as a microphone to convert sound into audio signals. The left-hand terminals of switch 14 are connected respectively to a first point of reference potential, and to a coupling capacitor C138. Capacitor C138 has a capacity, for example, of 47 microfarads.

Audio signals received from the telephone answering machine are coupled to the non-inverting input of a power amplifier designated Z104 by way of a second terminal board 16. The audio signals are introduced to the amplifier through a 0.01 microfarad capacitor C141 and a 220 kilo-ohm resistor R187. The amplitude of the audio signals is controlled by a potentiometer R701 which functions as a volume control. The audio signals introduced to amplifier Z104 are derived from the telephone answering machine when it is placed in its playback mode, so as to enable messages recorded on the message tape to be reproduced by speaker 10. The output of amplifier Z104 is connected to the coupling capacitor C138. The inverting input of the amplifier is connected to the first point of reference potential through a 2 kilo-ohm resistor R193. The output of the amplifier is connected to a 10 ohm resistor R188 which, in turn, is connected to a 0.1 microfarad capacitor C137 which, likewise, is connected to the first point of reference potential.

It is evident that when the switch 14 is in its first operating position, as illustrated in FIG. 1, the audio output of the amplifier Z104 is introduced to speaker 10 to be converted into sound. Also, one terminal of the speaker 10 is connected to the first point of reference potential, as is the amplifier Z104, as indicated by the conventional ground symbol.

When switch 14 is in its other operating position, the speaker is connected to a 0.01 microfarad series capacitor C1 and to a second point of reference potential, independent of the first point, and represented by the usual chassis ground symbol. The speaker 10 is now operating as a microphone. A resistor R1 of, for example, 47 ohms is now connected across the speaker 10 to help dampen resonances when the speaker is operating as a microphone. Capacitor C1 couples the speaker into the microphone circuitry of the telephone answering machine. Capacitor C1 provides roll-off characteristics at the low end of the audio signal band, when the speaker is operating as a microphone. The use of different ground connections when the speaker 10 is placed in its two operating conditions serves to avoid problems of oscillation and to reduce noise.

When switch 14 is in its right-hand operating position, the speaker 10 functions as a microphone. Damping resistor R1 is now connected across the speaker, and the audio signals from the speaker are introduced through capacitor C1 to the microphone circuitry of the telephone answering machine. Then by use of the normal controls of the machine, the speaker can be used to record new messages on the announcsement tape, as well as for dictation on the message tape.

Accordingly, in order for the speaker 10 to function as a microphone, it is switched into the microphone circuitry of the telephone answering machine by switch 14 which may be part of the telephone answering machine switching array. Then, when the telephone answering machine is switched, for example, to a mode for recording the outgoing announcement on the announcement tape, switch 14 automatically switches the microphone into the microphone circuitry for that purpose and disconnects it from the output of the audio power amplifier Z104. Likewise, when the telephone answering machine is switched to a dictation mode, in which notes, or other information may be dictated onto the message tape, again switch 14 switches the speaker to the microphone circuitry of the telephone answering machine and disconnects it from the audio power output amplifier Z104.

Likewise, when the telephone answering machine is switched to the play mode, or to a mode for monitoring a conversation or message, switch 14 is actuated automatically to connect the speaker to the output of the audio power amplifier Z104, and to disconnect it from the microphone input circuits. The operational modes of the telephone answering machine are such that the speaker 10 is never required to function as a speaker at the same time that a microphone input is needed.

As mentioned above, the resistor R1 serves as a terminating impedance for the speaker to provide damping and to prevent ringing and spurious responses from the speaker. As also mentioned, capacitor C1 couples the audio output from the speaker to the microphone amplifier stage of the telephone answering machine.

The circuit of FIG. 2 is an adaptation of the concept of the invention in which electronic switching rather than mechanical switching is used, which can be controlled by a microprocessor.

In the circuit of FIG. 2, the output of the audio output amplifier Z104 is coupled through a coupling capacitor C2 having a capacity of 47 microfarads to the speaker 10. One terminal of the speaker 10 is grounded, and the frame of the speaker is also connected to the grounded terminal, as shown. A 20 ohm resistor R4 is connected across the speaker terminals to provide damping.

For use as a microphone, the speaker terminals are coupled through respective 0.1 microfarad capacitors C6 and C7, and through 15 kilo-ohm resistors R5 and R6 to the inverting and non-inverting input terminals of a microphone amplifier Z2. The non-inverting input terminal of the amplifier is connected to a 470 kilo-ohm grounded resistor R8, which is shunted by a 220 picofarad capacitor C4. The output of amplifier Z2 is connected to a field effect transistor 100 (FET switch) which forms a switch, the output of which is connected to the audio microphone input stage of the telephone answering machine. The FET switch 100 is controlled by an $\overline{\text{OFF}}$/ON signal which is derived from the microprocessor.

The microphone amplifier Z2 is shunted by a 470 kilo-ohm resistor R7 in parallel with a 220 picofarad capacitor C3.

The supply voltage for the audio output amplifier Z104 is supplied to the amplifier through an NPN transistor Q1. A $\overline{\text{MUTE}}$ control signal from the microprocessor is introduced to the base of transistor Q1 through a diode D1. The collector of the transistor is connected to the anode of diode D1 through a 3 kiloohm resistor R2. The emitter of the transistor is connected back to the base through a 10 kilo-ohm resistor R9, and is connected to the voltage supply terminal of amplifier Z4. The emitter is also connected to a 2.2 kilo-ohm grounded resistor R3 and to a 10 microfarad grounded capacitor C8.

The circuit formed by transistor Q1, resistors R9 and R2, and diode D1 enables the supply voltage to be completely removed from the audio output amplifier Z104, when the speaker 10 is to be used as a microphone, rather than a speaker. When the $\overline{\text{MUTE}}$ control signal is low, transistor Q1 is made conductive, but when the $\overline{\text{MUTE}}$ control signal is pulled low by action of a driver transistor (not shown), transistor Q1 is rendered non-conductive, and power is removed from the audio output amplifier Z104.

The foregoing action achieves the same objective as mechanically switching the output of the power amplifier, as in the preceding embodiment, since with no power applied to the amplifier Z104, the positive side of capacitor C2 is floating, as it would be if it were disconnected.

Capacitor C8 is the normal voltage supply by-pass capacitor. Resistor R3 serves to bleed off all voltage on capacitor C8 quickly, thus ensuring that the amplifier Z104 is turned off completely and quickly when the $\overline{\text{MUTE}}$ control signal goes high. Diode D1, in conjunction with the base emitter voltage drop of transistor Q1, allows transistor Q1 to be turn off completely when the $\overline{\text{MUTE}}$ control signal goes low.

As mentioned above, resistor R4 terminates the speaker 10 to provide damping. The microphone input amplifier Z2 is configured differentially across the speaker. This eliminates the necessity of switching ground references and allows the speaker to remain connected to the speaker ground without picking up noise. To further reduce noise, the frame of the speaker is connected to the grounded speaker terminal, as shown.

The FET switch 100 in the output of microphone amplifier Z2 allows the audio to be turned on when speaker 10 is used as a microphone, and to be turned off when the speaker is being used to reproduce audio signals from the telephone answering machine. When the speaker functions as a speaker to reproduce the audio signals from the machine, the $\overline{\text{MUTE}}$ control signal is low, and the $\overline{\text{OFF}}$/ON control signal is high. This condition is such that the audio output amplifier Z104 is turned on, and the output from the microphone amplifier is turned off, the condition corresponding to the situation where the speaker is to be used to reproduce audio signals from the telephone answering machine.

On the other hand, when the speaker 10 is to function as a microphone, the $\overline{\text{MUTE}}$ control signal goes high and the $\overline{\text{OFF}}$/ON control signal goes low. This latter condition causes the audio output amplifier Z104 effectively to be turned off, and permits the output from the microphone amplifier Z2 to be passed to the audio microphone input stage of the telephone answering machine.

The invention provides, therefore, a simplified circuit and system for use in a telephone answering machine, whereby the speaker of the machine may also be used to record new announcements on the announcement tape.

It is to be understood that while a particular embodiment of the invention has been shown and described, modifications may be made. It is intended in the claims to cover all modifications which come within the true spirit and scope of the invention.

What is claimed is:

1. In a telephone answering system which includes a first mechanism for storing announcements therein which are transmitted over the telephone line in response to a ring signal received over the telephone line, and a second mechanism for storing dictation information and messages received over the telephone line from calling parties, a system for introducing announcement audio signals to the first mechanism to be stored therein and for introducing dictation audio signals to the second mechanism to be stored therein and for receiving message audio signals from the second mechanism to reproduce such signals, said system including: a transducer capable of transforming audio signals into sound and sound into audio signals; first circuit means for receiving audio signals from the first mechanism; second circuit means for introducing audio signals to the first and second mechanisms; and switching means having a first condition for effectively connecting the first circuit means to the transducer and having a second condition for connecting the transducer to the second circuit means.

2. The system defined in claim 1, in which said switching means in said first position connects said transducer to a first point of reference potential and said switching means in said second position connects said transducer to a second point of reference potential independent of said first point.

3. The system defined in claim 1, and which includes a damping resistor connected across said transducer at least when said switching means is in said second position.

4. The system defined in claim 3, and which includes a series capacitor connected to said resistor to dampen the response of the system with low frequency signals when the switching means is in said second position.

5. The system defined in claim 1, in which said first circuit means includes an output amplifier and circuitry coupling the output of said output amplifier to said transducer, and in which said second circuit means includes a second amplifier and circuitry coupling the input of said second amplifier to said transducer.

6. The system defined in claim 5, in which said switching means includes circuitry for supplying exciting voltage to said output amplifier when said switching means in said first condition and for removing the exciting voltage from said output amplifier when said switching means is in said second condition.

7. The system defined in claim 6, in which said switching means includes a field effect transistor switch connected to the output of said second amplifier in said second circuit means which is open when said switching means is in said first condition and which is closed when said switching means is in said second condition.

* * * * *